(12) United States Patent
Ho (10) Patent No.: US 9,845,107 B2
(45) Date of Patent: Dec. 19, 2017

(54) STEERING HUB SYSTEM DRIVEN BY BALL JOINT UNIVERSAL ROTARY MOTOR

(71) Applicant: Kuokwa Ho, Macau (CN)

(72) Inventor: Kuokwa Ho, Macau (CN)

( * ) Notice: Subject to any disclaimer, the term of this patent is extended or adjusted under 35 U.S.C. 154(b) by 0 days.

(21) Appl. No.: 15/332,248

(22) Filed: Oct. 24, 2016

(65) Prior Publication Data

US 2017/0040861 A1 Feb. 9, 2017

(30) Foreign Application Priority Data

Mar. 16, 2016 (CN) .......................... 2016 1 0150927
Jun. 20, 2016 (CN) .......................... 2016 1 0455022

(51) Int. Cl.
| | |
|---|---|
| *H02K 3/28* | (2006.01) |
| *B62D 5/04* | (2006.01) |
| *H02K 1/12* | (2006.01) |
| *H02K 1/27* | (2006.01) |
| *H02K 15/02* | (2006.01) |
| *H02K 15/08* | (2006.01) |
| *H02K 11/215* | (2016.01) |
| *H02K 21/22* | (2006.01) |

(Continued)

(52) U.S. Cl.
CPC ............. *B62D 5/0421* (2013.01); *H02K 1/12* (2013.01); *H02K 1/2786* (2013.01); *H02K 7/14* (2013.01); *H02K 11/215* (2016.01); *H02K 15/02* (2013.01); *H02K 15/08* (2013.01); *H02K 21/22* (2013.01); *H02K 26/00* (2013.01); *H02K 2201/03* (2013.01); *H02K 2201/18* (2013.01)

(58) Field of Classification Search
CPC .. H02K 3/28; H02K 5/10; H02K 1/12; H02K 1/2786; H02K 15/02; H02K 11/215; H02K 7/102; H02K 7/003; H02K 5/24; H02K 15/08; B62D 5/0421
USPC .................................................. 310/84, 328
See application file for complete search history.

(56) References Cited

U.S. PATENT DOCUMENTS

| | | | | |
|---|---|---|---|---|
| 6,144,137 | A * | 11/2000 | Engelbert | ............ B62D 5/0403 310/410 |
| 6,351,049 | B1 * | 2/2002 | Chassoulier | ............ F16C 11/06 310/90.5 |
| 2014/0125153 | A1 * | 5/2014 | Ho | ........................ H02K 41/031 310/36 |

* cited by examiner

*Primary Examiner* — Naishadh Desai
(74) *Attorney, Agent, or Firm* — Na Xu; IPro, PLLC (57) ABSTRACT

The invention provides a steering hub system driven by a ball joint universal rotary motor, including a hub body and a connection mechanism. The hub body is connected to a vehicle suspension via the connection mechanism. The hub body includes a ball joint universal rotary motor inside; the ball joint universal rotary motor includes a rotatable spherical shell-shaped rotor body having an opening, a spherical stator body disposed within the rotor body and connected to the connection mechanism, a first coil assembly and a second coil assembly both wound on the spherical stator body; when the first coil assembly is energized, the spherical shell-shaped rotor body rotates with respect to a first axis of the spherical stator body, and when the second coil assembly is energized, the spherical shell-shaped rotor body rotates with respect to a second axis of the spherical stator body, the first axis is not identical to the second axis. A sealing block is disposed at the opening of the spherical shell-shaped rotor body. The motor is a self-starting synchronous servo permanent magnet motor having wide range of stepless speed variation, self-steering power and dustproof ability, and the steering of the motor is sensitive, accurate, smooth, reliable, and convenient for operation, and the steering angle is large.

17 Claims, 7 Drawing Sheets

(51) Int. Cl.
*H02K 26/00* (2006.01)
*H02K 7/14* (2006.01)

STEERING HUB SYSTEM DRIVEN BY BALL JOINT UNIVERSAL ROTARY MOTOR

FIELD OF THE INVENTION

The invention relates to a steering hub system driven by a ball joint universal rotary motor.

BACKGROUND OF THE INVENTION

All over the world, the researches focusing on the spherical motor cost lots of money and some have been granted a patent certificate, for example, the utility model patent No. CN202085108U. However, limited by the two degrees of freedom of the cross axle, the motor of the patent can only move in two degrees of freedom.

In existing auto industry, the steering of vehicles often needs the assistance of external force, such as mechanical hydraulic power, electronic hydraulic power, and electric power. However, the steering is often ineffective or inaccurate, and the steering is difficult to control, and the steering angle is small.

Due to the abovementioned defects, the invention provides a steering hub system driven by a ball joint universal rotary motor, which is a continuation, supplementation, and improvement of a ball joint universal rotary motor, and is also an application of the ball joint universal rotary motor in the auto industry. The objective of the invention is to provide a steerable hub system having self-steering power.

SUMMARY OF THE INVENTION

In view of the above-described problems, it is one objective of the invention to provide a steering hub system driven by a ball joint universal rotary motor. The steering hub system has self-steering power and dustproof ability, and wide range of stepless speed variation, and the steering is sensitive, accurate, steady and smooth, reliable, and convenient for operation, and the steering angle is large.

To achieve the above objective, the invention provides a steering hub system driven by a ball joint universal rotary motor, comprising a hub body and a connection mechanism, the hub body being connected to a vehicle suspension via the connection mechanism. The hub body comprises a ball joint universal rotary motor inside; the ball joint universal rotary motor comprises a rotatable spherical shell-shaped rotor body having an opening, a spherical stator body disposed within the rotor body and connected to the connection mechanism, a first coil assembly and a second coil assembly both wound on the spherical stator body; when the first coil assembly is energized, the spherical shell-shaped rotor body rotates with respect to a first axis of the spherical stator body, and when the second coil assembly is energized, the spherical shell-shaped rotor body rotates with respect to a second axis of the spherical stator body, the first axis is not identical to the second axis.

A main axle is provided in a position of the first axis and is fixedly connected to the spherical stator body; the main axle extends out of the spherical shell-shaped rotor body from the opening thereof; outer surfaces of the spherical shell-shaped rotor body at two sides of the opening are provided with protective sliding sleeves, respectively; one end of each sliding sleeve close to the opening of the spherical shell-shaped rotor body is provided with a positioning block; a spherical sealing block is disposed between two positioning blocks, and the spherical sealing block is fixedly disposed on a front end of the main axle extending out of the opening of the spherical shell-shaped rotor body.

Preferably, a seal ring is disposed between the sealing block and each of the positioning blocks.

Preferably, the spherical shell-shaped rotor body comprises a thin spherical shell-shaped permanent magnet, a magnet yoke, and aluminum alloy protective layer; the permanent magnet is magnetized into a plurality of magnetic poles; the protective sliding sleeves are disposed at an outer surface of the aluminum alloy protective layer.

The spherical stator body comprises multiple layers of armatures in the shape of spherical segment; each layer of armature comprises an iron core in the shape of spherical segment formed from stacked multiple layers of silicon steel laminations; the multiple layers of armatures are symmetrically distributed with respect to the main axle of the spherical stator body; every two adjacent layers of armatures are provided with a spacer layer therebetween; the multiple layers of armatures and multiple spacer layers comprise taper holes having the same conicity at mounting positions thereof, and lock nuts in the shape of submerged cone are provided to match the taper holes whereby achieving the self-locking fixation and sealing connection of the main axle and the multiple layers of armatures and multiple spacer layers; the lock nuts of the main axle are screwed up via an external screw.

plurality of winding slots are disposed circumferentially at a periphery of each silicon steel lamination, and an opening of each winding slot is facing outward;

the iron core of at least one layer of armature is wound with the first coil assembly; the first coil assembly is wound on the iron core of the same layer of armature;

the iron core of at least another layer of armature is wound with the second coil assembly; the second coil assembly on the layer of armature is electrically connected to another second coil assembly on another layer of armature that is symmetrically distributed with the layer of armature along the main axle.

Preferably, two sides of the main axle are provided with fixing axles for fixing armatures, respectively; two ends of the fixing axles are located at spacer layers of second layers of armatures at a head end and a tail end of the main axle, respectively; the multiple layers of armatures and multiple spacer layers comprise taper holes having the same conicity at mounting positions thereof, and lock nuts in the shape of submerged cone are provided to match the taper holes whereby achieving the self-locking fixation and sealing connection of the fixing axles and the multiple layers of armatures and multiple spacer layers; the lock nuts of the fixing axles and silicon steel laminations spherical body formed a self-locking to screw up with an external screw of the main axle.

Preferably, the aluminum alloy protective layer comprises an opening member close to the opening and a closed cover away from the opening; the opening member and the closed cover are fixed via a flange and a bolt, and the protective sliding sleeves are disposed on an outer surface of the opening member.

Preferably, a number of layers of the armatures are at least 3 and is an odd number; the armature in a middle layer is a self-starting armature; the first coil assembly of the self-starting armature is connected to the corresponding second coil assembly thereof, so that after being energized, the spherical shell-shaped rotor body rotates with respect to the first axis. It is simpler than ordinary synchronous machine which needs a starting dynamo separately. When starting, the spherical shell-shaped rotor body rotates with respect to the Z axis in the XOY plane with other armatures.

Preferably, the ball joint universal rotary motor is prepared according to following steps: stacking and fixing silicon steel sheets using a numerical control wire electric discharge machining according to diameters of the silicon steel sheets, and processing the silicon steel sheets into coil slots according to design drawings, each armature comprising a plurality of coil slots with different spherical diameters; distributing the coil slots according to layers of the armatures; processing a plurality of coil slots having the same sizes each time until all sizes of coil slots of a half sphere are obtained, and each sphere comprising two coil slots having the same size; preparing coil slots of silicon steel laminations having different spherical diameters; stacking the silicon steel laminations to yield multiple layers of armatures, allowing lock nuts in the shape of submerged cone of the main axle to pass through corresponding taper holes of the armatures and spacer layers whereby achieving the self-locking fixation and sealing connection of the multiple layers of armatures, and screwing up the external screw of the main axle;

winding the first coil assembly on the coil slot of iron core of each layer of armature, the first coil assembly being wound on the same layer of armature; winding the second coil assembly on the coil slot of iron core of each layer of armature, the second coil assembly on one layer of armature being electrically connected to another second coil assembly on another layer of armature that is symmetrically distributed with the layer of armature along the main axle; securing the spherical stator body within the spherical shell-shaped rotor body.

Preferably, the step of allowing lock nuts in the shape of submerged cone of the main axle to pass through corresponding taper holes of the armatures and spacer layers whereby achieving the self-locking fixation and sealing connection of the multiple layers of armatures, and screwing up the external screw of the main axle, fine machining outer surfaces of the coil slots of the silicon steel laminations of the armatures so as to make the outer surfaces of the multiple layers of armatures be spherical.

Preferably, a magnetic-sensing device and a magnetic-sensing Hall device are disposed outside the spherical stator body; the magnetic-sensing device operates to detect magnetic fluxes of the permanent magnet, the first coil assembly, and the second coil assembly after being energized, and the magnetic-sensing Hall device operates to detect a relative position of the spherical shell-shaped rotor body and the spherical stator body so as to ensure the implementation of magnetic balance/magnetic levitation.

Preferably, a plurality of nonmagnetic ball bearings are disposed between the spherical shell-shaped rotor body and the spherical stator body.

Preferably, a spherical support is disposed between the spherical shell-shaped rotor body and the spherical stator body, and the ball bearings are uniformly distributed in the spherical support. Additionally, a 3D spherical bearing is formed between the spherical stator body formed by the silicon steel laminations and the permanent magnet, which is a necessary safety precaution and can prevent damages caused by the contact and friction between the permanent magnet and the spherical stator body due to abrupt power failure and the pressure effect.

Preferably, a brake mechanism is disposed on an outer surface of the spherical shell-shaped rotor body and opposite to the opening, the braking mechanism comprises a right roller support fixed on the spherical shell-shaped rotor body and a bearing seat, a brake is disposed on the right roller support, and a support seat of the brake is disposed on the bearing seat.

Preferably, there are two kinds of brake mechanisms, drum brake or disc brake can be symmetrically disposed two outsides of the main axle as required.

Preferably, the connection mechanism comprises a ball basket universal joint connected to output from the main axle, a pull rod sliding sleeve of the ball basket universal joint, an outer universal joint connecting to a chassis and the main axle, a V-shaped lower swing connection rod, and a suspension universal screw; the ball basket universal joint is connected to the main axle via the suspension universal screw.

Preferably, the hub body comprises a first stabilization mechanism and a second stabilization mechanism which are disposed at two sides of the opening of the spherical shell-shaped rotor body, respectively; the first stabilization mechanism and the second stabilization mechanism each comprise a support base disposed on the spherical shell-shaped rotor body, a left roller support disposed on the support base, a spherical hinge bearing having a sliding button disposed on the left roller support, a sliding pull rod disposed on the spherical hinge bearing having a sliding button, a sliding sleeve disposed on the sliding pull rod, a steering ball-basket universal joint connected to the sliding pull rod, and a swing arm connected to the steering ball-basket universal joint; and the swing arm is disposed on a base via a swing hinge.

Preferably, a vibration damper is disposed between the first stabilization mechanism and the second stabilization mechanism; the vibration damper comprises a spherical hinge damping bearing disposed on the swing arm of the first stabilization mechanism, a spring hanger connected to the spherical hinge damping bearing, a spherical hinge connecting shaft connected to the spring hanger, a movable rotating ball spindle disposed on the spherical hinge connecting shaft, a movable sliding block disposed on the rotating ball spindle, and a damping spring; the sliding block comprises a fixing surface having a T-shaped groove; the fixing surface is connected to a vehicle body via a fixing screw, and two ends of the damping spring are connected to the swing arms of the first stabilization mechanism and the second stabilization mechanism via damping bearings, respectively.

Advantages of the invention are summarized as follows.

The invention provides a steering hub system driven by a ball joint universal rotary motor, which enables the ball joint universal rotary motor to be applied to the steering of auto tires. The rotatable spherical shell-shaped rotor body and the hub body are fixed via the main axle. The system has a simple structure. When the rotary motor is running, the spherical shell-shaped rotor body drives the hub body to rotate, so as to make the hub body have the self-steering power, and ensure the steering of the vehicle is reliable. By adjusting the current magnitude and electrifying time of the rotary motor, the vehicle can be steered from various angles, and the steering is sensitive and the operation is simple. The rotary motor comprises a layer of self-starting armature, which ensures the hub body works reliably. The self-starting synchronous servo permanent magnet motor has wide range of stepless speed variation. The sealing blocks are disposed in the vicinity of the opening of the spherical shell-shaped rotor body, which can prevent the motor from polluting when the hub body is rotating and steering. The steering hub system further comprises a magnetic-sensing device, a magnetic-sensing Hall device, ball bearings, and supports, which greatly improves the mechanical efficiency, and saves the energy consumption. The hub body comprises a connection mechanism, stabilization mechanisms, and a vibration damper, which ensures the vehicle has smooth and reliable steering.

Legends: 11. Armature; 12. Spacer layer; 13. Fixing axle; 14. Main axle; 15. Lock nuts of fixing axle; 16. Lock nuts of main axle; 17. Hole; 18. First coil assembly; 19. Second coil assembly; 20. Silicon steel lamination of stator; 21. Magnet yoke; 22. Permanent magnet; 23. Opening member; 24. Closed cover; 25. Bolt; 26. Fixing bolt hole; 27. Hub shell; 28. Bearing seat of opening member; 31. Sealing block; 32. Positioning block; 33. Protective sliding sleeve; 35. Seal ring; 41. Magnetic-sensing device; 42. Magnetic-sensing Hall device; 51. Ball bearing; 52. Support; 61. Right roller support; 62. Bearing seat; 63. Support seat; 64. Drum brake; 65. Disc brake; 71. Outer universal joint connecting to a chassis; 72. Pull rod sliding sleeve 72 of ball basket universal joint; 73. Ball basket universal joint connected to output from main axle; 74. Suspension universal screw; 75. V-shaped lower swing connection rod; 81. Base; 82. Swing hinge; 83. Swing arm; 84. Steering ball-basket universal joint; 85. sliding sleeve; 86. Sliding pull rod; 87. Spherical hinge bearing having a sliding button; 88. Left roller support; 89. Support base; 91. Sliding block; 92. Rotating ball spindle; 93. Fixing surface; 94. Fixing screw; 95. Spherical hinge connecting shaft; 96. Spring hanger; 97. Spherical hinge damping bearing; 98. Spring; 99. Damping bearing.

DETAILED DESCRIPTION OF THE EMBODIMENTS

For clear understanding of the objectives, features and advantages of the invention, detailed description will be given below in conjunction with accompanying drawings and specific embodiments.

As shown in FIGS. 1-4, the invention provides a steering hub system driven by a ball joint universal rotary motor, comprising a hub body and a connection mechanism. The hub body is connected to a vehicle suspension via the connection mechanism. The hub body comprises a ball joint universal rotary motor inside; the ball joint universal rotary motor comprises a rotatable spherical shell-shaped rotor body having an opening, a spherical stator body disposed within the rotor body and connected to the connection mechanism, a first coil assembly 18 and a second coil assembly 19 both wound on the spherical stator body; when the first coil assembly 18 is energized, the spherical shell-shaped rotor body rotates with respect to a first axis of the spherical stator body, and when the second coil assembly 19 is energized, the spherical shell-shaped rotor body rotates with respect to a second axis of the spherical stator body, the first axis is not identical to the second axis; a main axle 14 is provided in a position of the first axis and is fixedly connected to the spherical stator body; the main axle 14 extends out of the spherical shell-shaped rotor body from the opening thereof.

Suppose the first axis (the axis of the main axle 14) is Z axis, the plane which is vertical to the Z axis and where the center of a circle of the spherical shell-shaped rotor body is located is an XOY plane, when the main axle 14 is fixed, and the spherical shell-shaped rotor body is fixedly connected to the hub body, the first coil assembly 18 is energized, the spherical shell-shaped rotor body rotates with respect to the Z axis. When the second coil assembly 19 is energized, the spherical shell-shaped rotor body is tilted with respect to the Z axis, and thus rotates in the XOZ plane or in the YOZ plane. To ensure the stability and accuracy of the steering of the spherical shell-shaped rotor body, each time the rotary motor rotates at a small angle, by continuously outputting control signals, thus the current is loaded to the first coil assembly 18 or the second coil assembly 19 continuously. As a result, the rotary motor is capable of rotating or steering quickly, and the steering angle can be adjusted by controlling the loading time of the current, thus the rotary motor can rotate in all directions.

Figure 1:
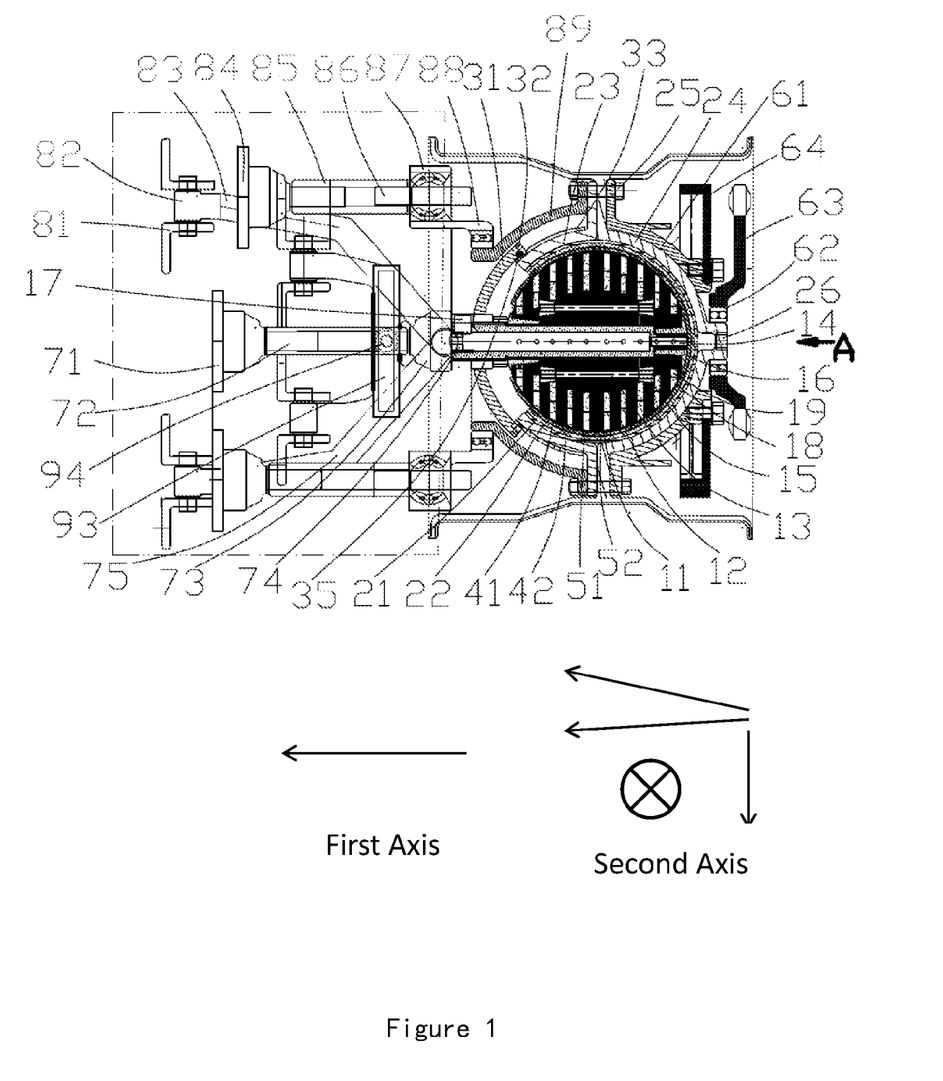
FIG. 1 is a horizontal cross-section of a steering hub system driven by a ball joint universal rotary motor of the invention.
Figure 4:
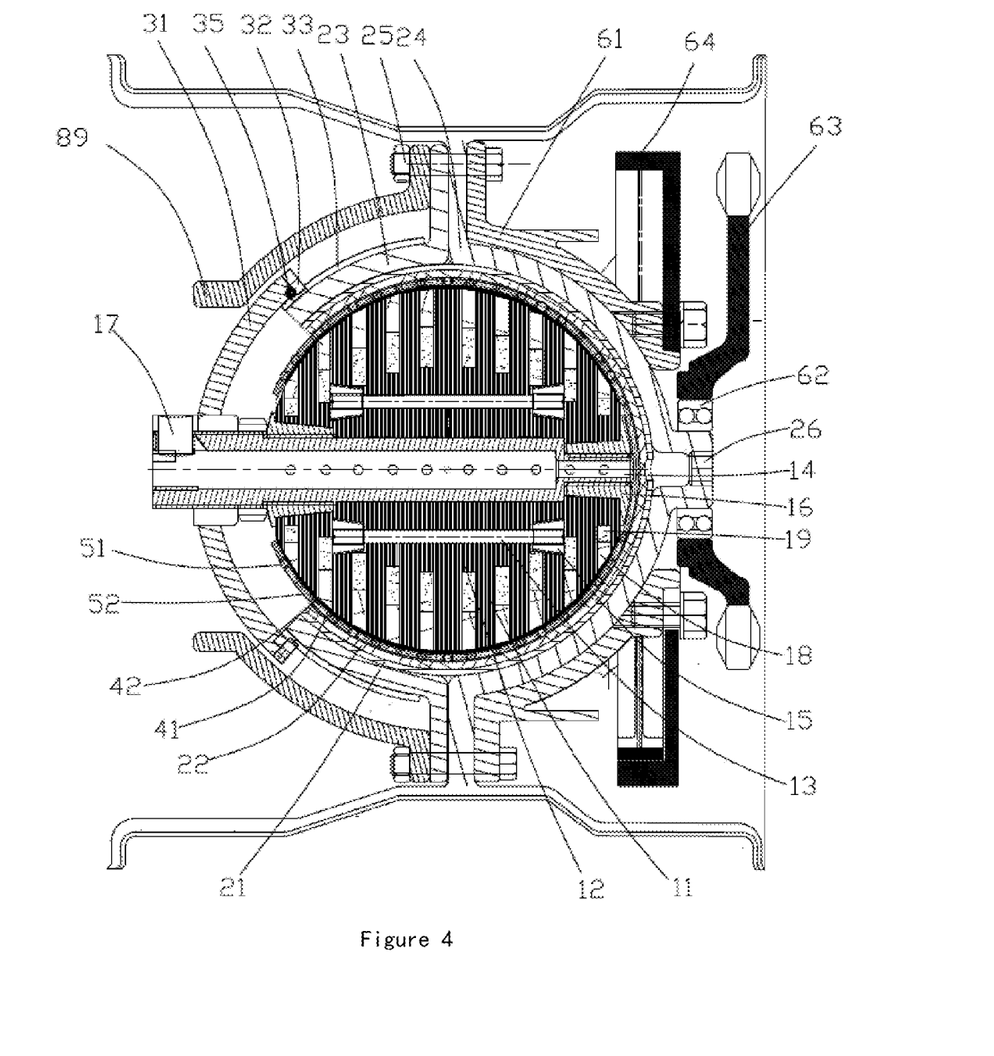
FIG. 4 is a partial enlarged view of a horizontal cross-section of a ball joint universal rotary motor of the invention.
Figure 5:
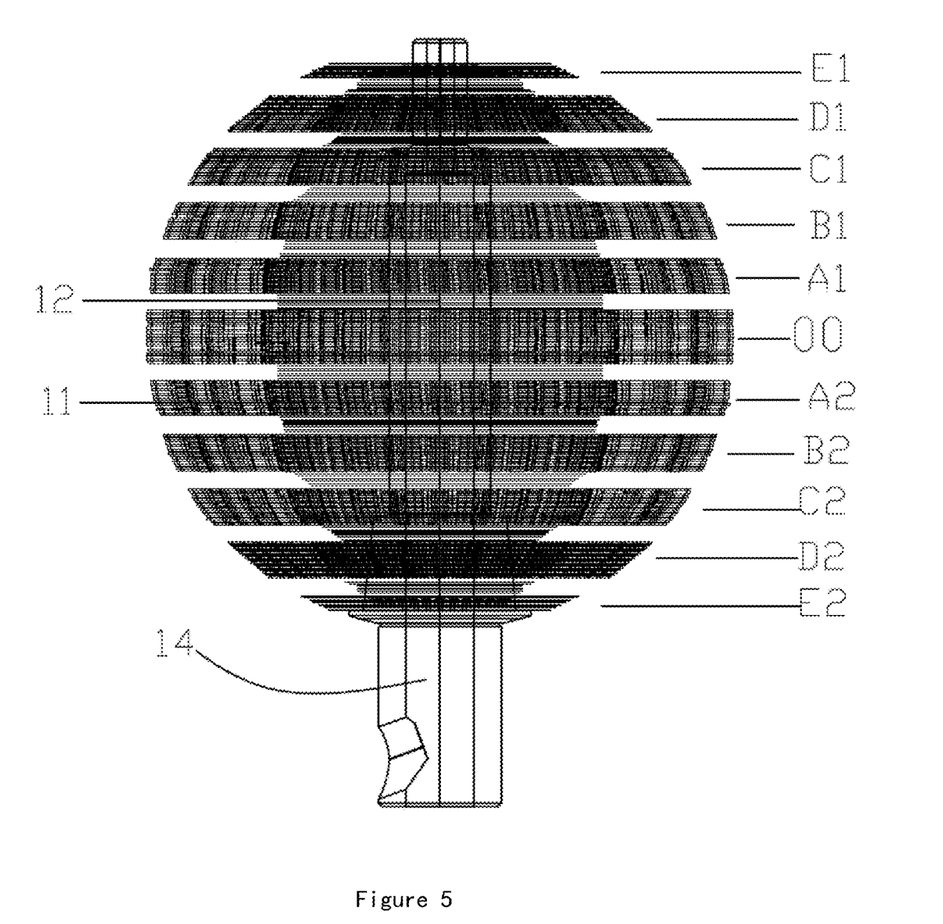
FIG. 5 is a schematic diagram of a spherical stator body of the invention.

As shown in FIGS. 1, 4 and 5, the spherical stator body comprises multiple layers of armatures 11 in the shape of spherical segment; each layer of armature 11 comprises an iron core in the shape of spherical segment formed from stacked multiple layers of silicon steel laminations. That is to say, each layer of armature 11 comprises a plurality of silicon steel laminations having the same shape and different outer diameters. A plurality of winding slots are disposed circumferentially at the periphery of each silicon steel lamination, and an opening of each winding slot is facing outward. The multiple layers of armatures 11 are symmetrically distributed with respect to the main axle 14 of the spherical stator body; every two adjacent layers of armatures are provided with a spacer layer 12 therebetween; the multiple layers of armatures 11 and multiple spacer layers 12 comprise taper holes having the same conicity at mounting positions thereof, and lock nuts 16 in the shape of submerged cone are provided to match the taper holes whereby achieving the self-locking fixation and sealing connection of the main axle and the multiple layers of armatures and multiple spacer layers; the lock nuts 16 of the fixing axles and silicon steel laminations spherical body formed a self-locking to screw up with an external screw of the main axle 14. When the diameter of the armature 11 is greater than 100 mm, to ensure the reliable and stable connection of the multiple layers of armatures 11, fixing axles 13 are often provided. The fixing axles 13 are symmetrically disposed at two sides of the main axle 14. Two ends of the fixing axles 13 are located at spacer layers 12 of second layers of armatures 11 at a head end and a tail end of the main axle, respectively; the multiple layers of armatures 11 and multiple spacer layers 12 comprise taper holes having the same conicity at mounting positions thereof, and lock nuts 15 in the shape of submerged cone are provided to match the taper holes whereby achieving the self-locking fixation and sealing connection of the fixing axles and the multiple layers of armatures and multiple spacer layers; the lock nuts 15 of the fixing axles 13 are screwed up via an external screw.

To ensure the universal rotation of the rotary motor, the iron core of at least one layer of armature 11 is wound with the first coil assembly 18; the first coil assembly 18 is wound on the iron core of the same layer of armature 11.

The iron core of at least another layer of armature 11 is wound with the second coil assembly 19; the second coil assembly 19 on the layer of armature 11 is electrically connected to another second coil assembly 19 on another layer of armature 11 that is symmetrically distributed with the layer of armature along the main axle.

In this example, to ensure the using effect and the sensitivity of the rotary motor, the iron core of each layer of armature 11 is wound with the first coil assembly 18; the first coil assembly 18 is wound on the iron core of the same layer of armature 11. The iron core of each layer of armature 11 is wound with the second coil assembly 19; the second coil assembly 19 on the layer of armature 11 is electrically connected to another second coil assembly 19 on another layer of armature 11 that is symmetrically distributed with the layer of armature along the main axle. After the coil assemblies are energized, alternating magnetic field is generated in the same layer of armature 11, thus driving the spherical shell-shaped rotor body to rotate with respect to the main axle 14. Because the second coil assembly 19 on each layer of armature 11 is electrically connected to another second coil assembly 19 on another layer of armature 11 that is symmetrically distributed with the layer of armature along the main axle, when the second coil assembly 19 is energized, the spherical shell-shaped rotor body is tilted with respect to the axis of the spherical stator body, thus enabling the spherical shell-shaped rotor body to move in the second degree of freedom. With the alteration of the current magnitude and loading time of the current flowing in the second coil assembly 19, the tilt angle of the spherical shell-shaped rotor body changes accordingly, and thus the rotary motor rotates at various degrees of freedom, whereby achieving the steering of the vehicle. Without the pull connection rod, the vehicle tire can also be driven through the electric transmission.

To achieve the self-starting control of the rotary motor, the number of layers of the armatures are at least 3 and is an odd number. In this example, as shown in FIG. 5, the layers of armatures 11 are distributed and named as follows: OO, A1-A2, B1-B2, C1-C2, D1-D2, E1-E2, where A1 and A2 are symmetrically disposed, B1 and B2 are symmetrically disposed, C1 and C2 are symmetrically disposed, D1 and D2 are symmetrically disposed, E1 and E2 are symmetrically disposed. The two symmetrical iron cores have the same diameter. The layer OO is an independent central main armature, i.e., the self-starting control armature. The first coil assembly 18 of the self-starting control armature is electrically connected to the corresponding second coil assembly 19, and after being energized, the spherical shell-shaped rotor body rotates with respect to the first axis.

Specifically, the ball joint universal rotary motor is prepared according to following steps: stacking and fixing silicon steel sheets using a numerical control wire electric discharge machining according to diameters of the silicon steel sheets, and processing the silicon steel sheets into coil slots according to design drawings, each armature 11 comprising a plurality of coil slots with different spherical diameters; distributing the coil slots according to layers of the armatures 11; processing a plurality of coil slots having the same sizes each time until all sizes of coil slots of a half sphere are obtained, and each sphere comprising two coil slots having the same size; preparing coil slots of silicon steel laminations having different spherical diameters; stacking the silicon steel laminations to yield multiple layers of armatures, allowing lock nuts 16 in the shape of submerged cone of the main axle 14 to pass through corresponding taper holes of the armatures 11 and spacer layers 12 whereby achieving the self-locking fixation and sealing connection of the multiple layers of armatures 11, and screwing up the external screw of the main axle 14; fine machining outer surfaces of the coil slots of the silicon steel laminations of the armatures so as to make the outer surfaces of the multiple layers of armatures 11 be spherical; winding the first coil assembly 18 on the coil slot of iron core of each layer of armature, the first coil assembly 18 being wound on the same layer of armature 11; winding the second coil assembly 19 on the coil slot of iron core of each layer of armature, the second coil assembly 19 on one layer of armature being electrically connected to another second coil assembly 19 on another layer of armature 11 that is symmetrically distributed with the layer of armature 11 along the main axle; securing the spherical stator body within the spherical shell-shaped rotor body.

In this example, especially when the diameter of the armature 11 is greater than 100 mm, the fixing axles 13 are provided and symmetrically disposed at two sides of the main axle 14. Two ends of the fixing axles 13 are located at spacer layers 12 of second layers of armatures 11 at a head end and a tail end of the main axle 14, respectively. Upon assembling the silicon steel laminations, the layers of armatures 11 OO, A1-A2, B1-B2, and C1-C2 and the spacer layers 12 thereof are assembled and fixed via the fixing axles 13, and then are fixed by the lock nuts in the shape of submerged cone, followed by assembly of the main axle 14 and the layers of armatures 11 D1-D2 and E1-E2. The main axle 14 and the silicon steel laminations are fixed by the lock nuts 16 in the shape of submerged cone. Thereafter, the outer surfaces of the coil slots of the silicon steel laminations of the armatures 11 are fine machined so as to make the outer surfaces of the multiple layers of armatures 11 be spherical. The spherical outer surfaces of the multiple layers of armatures 11 area favorable to the rotation of the spherical shell-shaped rotor body with respect to the main axle 14 of the spherical stator body. The iron core of each layer of armature is wound with two coil assemblies. The first coil assembly 18 is wound on the coil slots of the iron core of the same layer of armature 11. In this example, the spherical iron core can be designed to have 36 slots and four poles for winding. 72 coils are wound on the spherical iron core. The first coil is wound between the first and the third slots, the second coil is wound between the second and fourth slots, and the third coil is wound between the third and fifth slots, and so on. That is to say, each coil is wound between two slots with one slot spaced. In addition, the coil wound between the first slot and the third slot is connected to the coil wound between the $13^{th}$ and the $15^{th}$ slots, and so on. The second coil assembly 19 on one layer of armature is electrically connected to another second coil assembly 19 on another layer of armature 11 that is symmetrically distributed with the layer of armature 11 along the main axle.

It should be noted that, the coil wound between the first and the third slots of the armature 11 of the layer A1 is not electrically connected to the coil wound between the $13^{th}$ and the $15^{th}$ slots of the armature 11 of the layer A1, but electrically connected to the coil wound between the $13^{th}$ and the $15^{th}$ slots of the armature 11 of the layer A2. The coil wound between the 4th and the 6th slots of the armature 11 of the layer A1 is electrically connected to the coil wound between the $16^{th}$ and the $18^{th}$ slots of the armature 11 of the layer A2, and so on. That is to say, the coil in each layer of armature 11 is electrically connected to another coil on another layer of armature 11 that is symmetrically distributed with the layer of armature 11 along the main axle. Optionally, the coil can be wound with another mode. For example, the armatures in the layers A1, A2 are only wound with the first coil assembly 18, and the armatures in the layers B1, B2 are only wound with the second coil assembly 19. Or, when the second coil assembly 19 in the armatures of the layers A1, A2 is energized, the spherical shell-shaped rotor body rotates in the plane XOZ; when the second coil assembly 19 in the armatures of the layers B1, B2 is energized, the spherical shell-shaped rotor body rotates in the plane YOZ; and when the second coil assembly 19 in the armatures of the layers C1, C2 is energized, the spherical shell-shaped rotor body rotates in a plane which is tilted at 45 degrees with the plane XOZ. Through energizing the second coil assembly 19 in different armatures, the rotary motor can rotate at different directions, thus achieving the three-dimensional rotation in planes X_Y, Z_X, Z_Y. When the spherical iron core has a large diameter, the number of the coil slots can be increased to 36, 48, 64, or 96 slots, and the layer number of the armature 11 is also increased in proportion.

Figure 2:
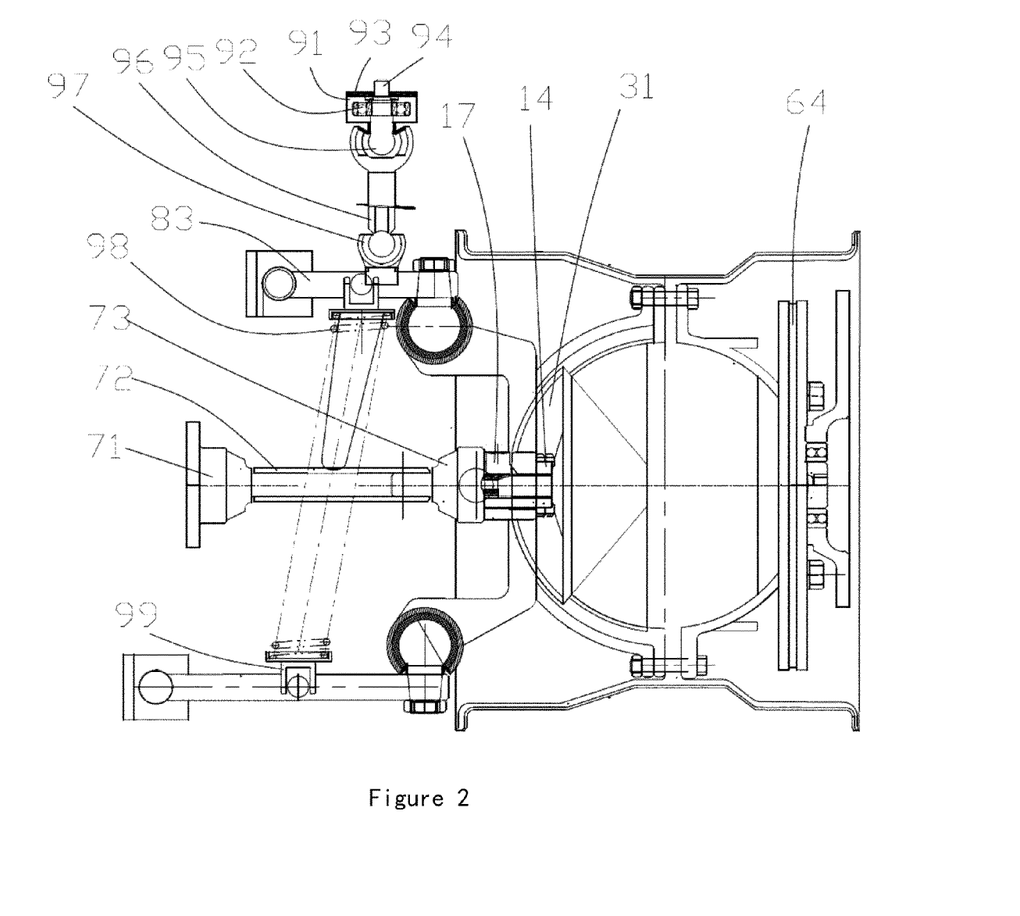
FIG. 2 is a front view of a steering hub system driven by a ball joint universal rotary motor of the invention.
Figure 3:
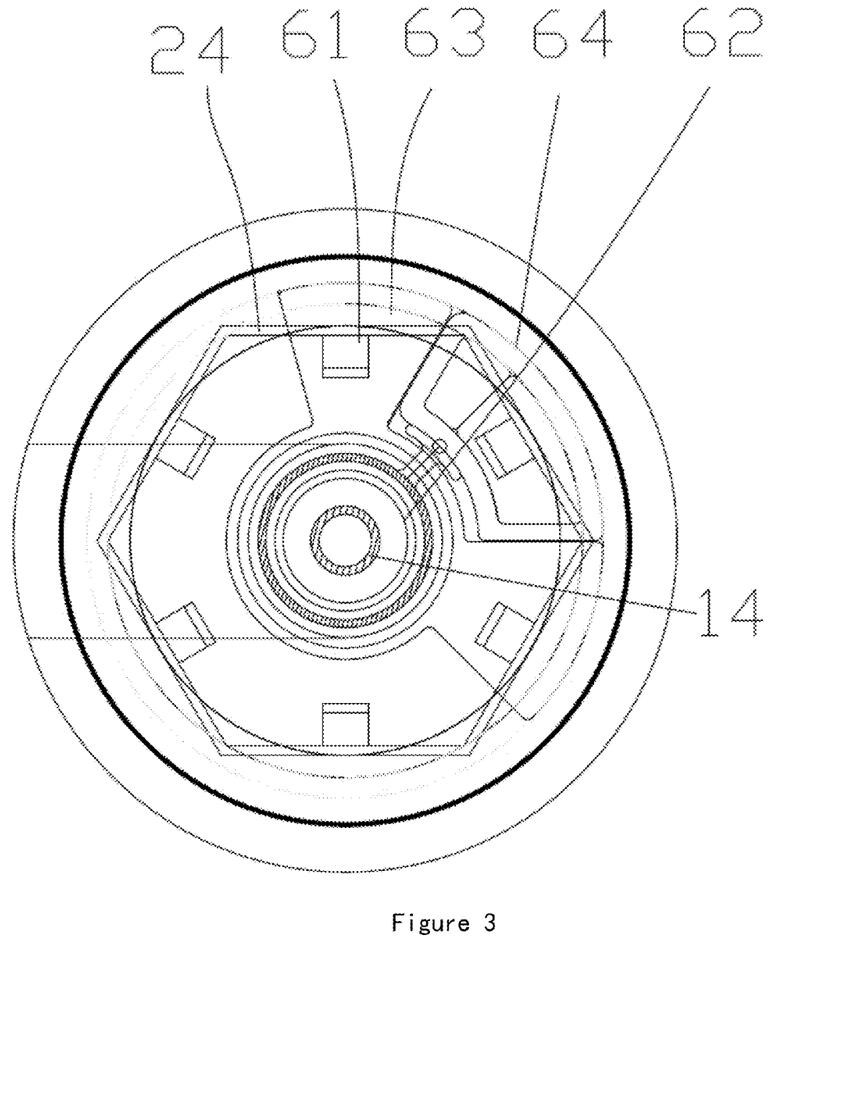
FIG. 3 is a cross-sectional view of a steering hub system driven by a ball joint universal rotary motor of the invention taken from direction A in FIG. 1.

As shown in FIGS. 1 and 2, the spherical shell-shaped rotor body comprises a thin spherical shell-shaped permanent magnet 22, a magnet yoke 21, and aluminum alloy protective layer; the permanent magnet 22 is magnetized into a plurality of magnetic poles. The pole pairs of the permanent magnet are designed as needed, which can be 2-4 poles in high speed, and 8-16 poles in other conditions. The magnet yoke 21 can resist the adverse effect and radiation of the magnetic line of force, particularly when the vehicle is running, can shield the interfering signals from outside, thus preventing the influence of the external magnetic field on the rotary motor. The aluminum alloy protective layer comprises an opening member 23 close to the opening and a closed cover 24 away from the opening; the opening member 23 and the closed cover 24 are fixed via a flange and a bolt 25. A fixing bolt hole 26 is disposed in the middle of the closed cover 24 to fix the closed cover 24 on the hub body.

Figure 7:
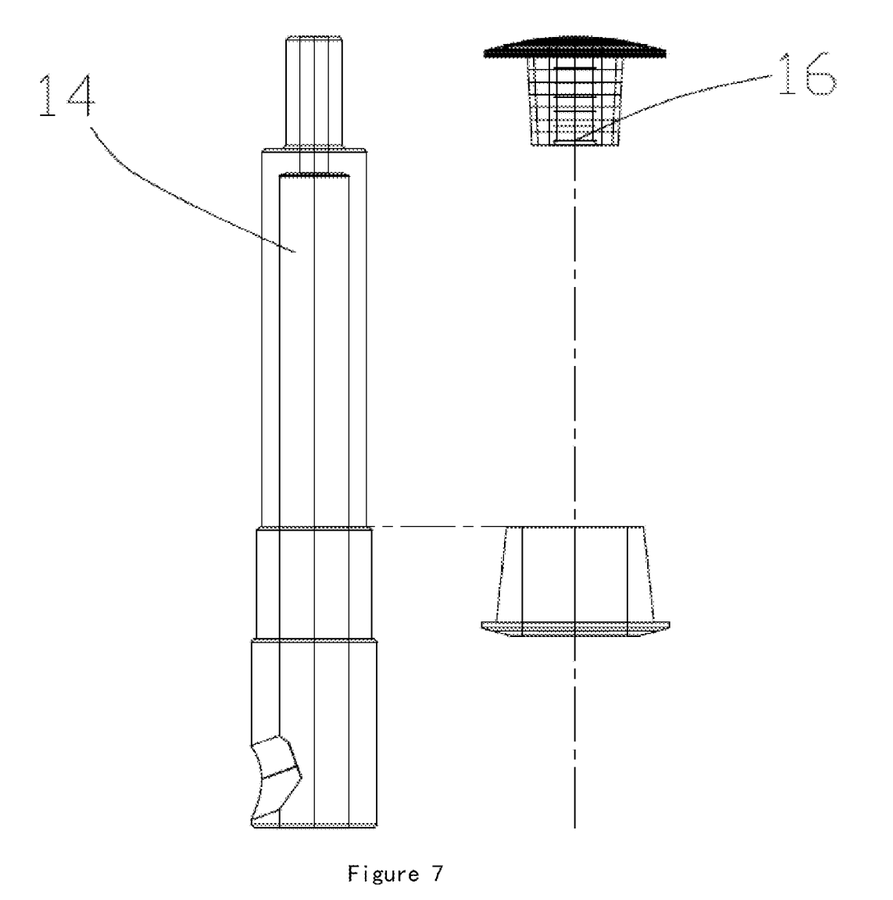
FIG. 7 is a schematic diagram of a main axle of the invention.

As shown in FIGS. 1, 4 and 7, the main axle 14 is hollow, and the output end thereof is provided with a hole 17, which is an inlet and outlet of the lead wire of slot coils of the armature 11. The control wire passes through the hollow main axle 14 via the hole 17 and enters the junction box of the front/rear axle of the vehicle.

As shown in FIGS. 1 and 4, because the spherical shell-shaped rotor body comprises the opening, to protect the spherical stator body, outer surfaces of the spherical shell-shaped rotor body at two sides of the opening are provided with protective sliding sleeves 33, respectively; one end of each sliding sleeve 33 close to the opening of the spherical shell-shaped rotor body is provided with a positioning block 32; a spherical sealing block 31 is disposed between two positioning blocks 32, and the spherical sealing block 31 is fixedly disposed on a front end of the main axle 14 extending out of the opening of the spherical shell-shaped rotor body. A seal ring 35 is disposed between the sealing block 31 and each of the positioning blocks 32. In this example, the protective sliding sleeves 33 are disposed on the sliding slots at the outer surface of the opening member 23. The spherical sealing block 31 is a spherical shell larger than or equal to 90 degrees. When the spherical shell-shaped rotor body rotates, no opening occurs in the spherical stator body. However, when the spherical shell-shaped rotor body steers, the opening member 23 moves towards the left or the right. At this moment, the positioning blocks 32 pull the protective sliding sleeves 33 to move to the vacancy, thus preventing the dust from entering the spherical stator body. The seal ring 35 also has functions of protection and preventing dust.

As shown in FIGS. 1 and 4, a magnetic-sensing device 41 and a magnetic-sensing Hall device 42 are disposed outside the spherical stator body; the magnetic-sensing device 41 and the magnetic-sensing Hall device 42 both operate to detect magnetic fluxes of the NdFeB permanent magnet 22, the first coil assembly 18, and the second coil assembly 19 after being energized. By controlling the voltage and electric quantity, let $\mathcal{C}$ NdFeB≥ or ±$\mathcal{C}$ coil=0, thus generating the phenomenon of magnetic balance-magnetic levitation. The magnetic-sensing Hall device 42 operates to detect a relative position of the spherical shell-shaped rotor body and the spherical stator body. With the help of magnetic levitation technology and without the limitation of degree of freedom, there is no barrier between the spherical stator body and the permanent magnet 22, the friction factor is the least, thus greatly improving the mechanical efficiency and saving the energy consumption.

Figure 6:
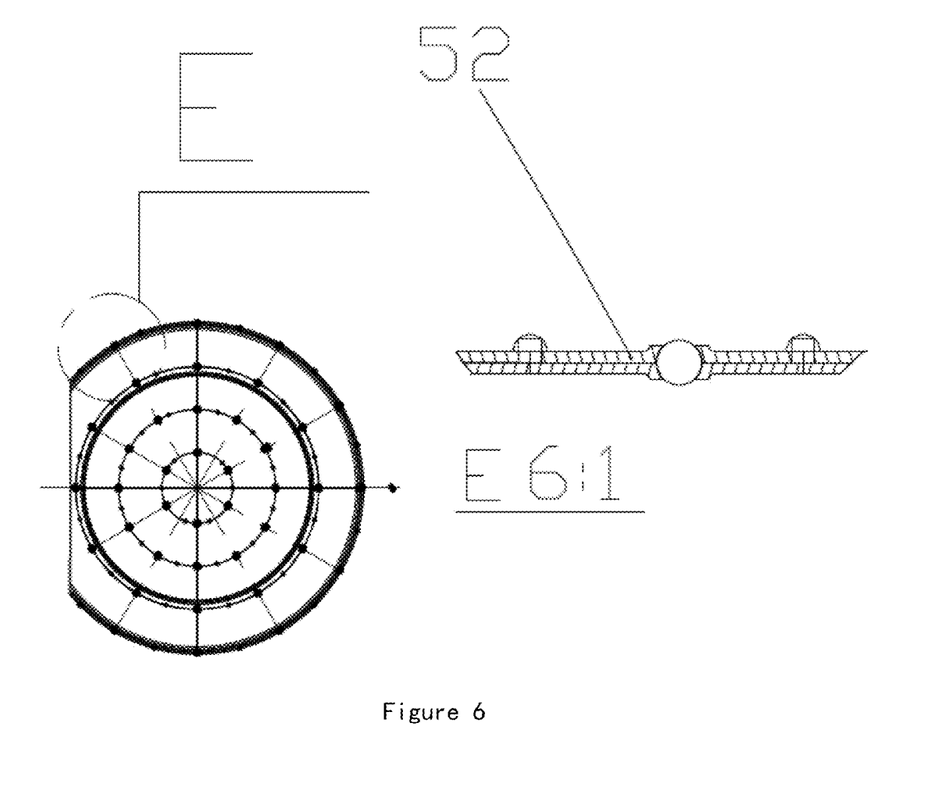
FIG. 6 is a schematic diagram of a support of the invention.

As shown in FIGS. 1, 4 and 6, a plurality of nonmagnetic ball bearings 51 are disposed between the spherical shell-shaped rotor body and the spherical stator body. The ball bearings 51 can prevent the direct friction between the spherical stator body and the permanent magnet 22, but the distribution and transmission of the magnetic line of force are not affected, thus improving the safety. In addition, a spherical support 52 is disposed between the spherical shell-shaped rotor body and the spherical stator body, and the ball bearings 51 is disposed on the support 52. The support 52 is made of Glass-filled Nylon by injection molding. Different from conventional plain cylindrical bearings, the support is a spherical circle, the upper and lower layers fix the ball bearings 51 and allow the ball bearings 51 to rotate flexibly, a cylinder is provided between the spheres for riveting.

As shown in FIGS. 1 and 4, a brake mechanism is disposed on an outer surface of the spherical shell-shaped rotor body and opposite to the opening, the braking mechanism comprises a right roller support 61 fixed on the spherical shell-shaped rotor body and a bearing seat 62, a brake 64 is disposed on the right roller support 61, and a support seat 63 of the brake 64 is disposed on the bearing seat 62. In this example, two brake mechanisms are provided and symmetrically disposed at two sides of the main axle 14, thus ensuring the braking effect. Specifically, a drum brake 64 is disposed on the rear wheel, a disc brake 64 is disposed on the front wheel, and the support seat 63 of the brake 64 is a torus.

As shown in FIGS. 1 and 2, the connection mechanism comprises a ball basket universal joint 73 connected to output from the main axle, a pull rod sliding sleeve 72 of the ball basket universal joint, an outer universal joint 71 connecting to a chassis and the main axle, a V-shaped lower swing connection rod 75, and a suspension universal screw 74; the ball basket universal joint 73 is connected to the main axle 14 via the suspension universal screw 74.

As shown in FIGS. 1 and 2, the hub body comprises a first stabilization mechanism and a second stabilization mechanism which are disposed at two sides of the opening of the spherical shell-shaped rotor body, respectively; the first stabilization mechanism and the second stabilization mechanism each comprise a support base 89 disposed on the spherical shell-shaped rotor body, a left roller support 88 disposed on the support base 89, a spherical hinge bearing 87 having a sliding button disposed on the left roller support 88, a sliding pull rod 86 disposed on the spherical hinge bearing 87 having a sliding button, a sliding sleeve 85 disposed on the sliding pull rod 86, a steering ball-basket universal joint 84 connected to the sliding pull rod 86, and a swing arm 83 connected to the steering ball-basket universal joint 84; and the swing arm 83 is disposed on a base 81 via a swing hinge 82. The support base 89 is a cylindrical thin-walled structure, and the opening distance of the support base 89 is greater than or equal to 154 mm, so that the rotation of the spherical shell-shaped rotor body causes no disturbance to the main axle 14. The left roller support 88 is a special product designed as needed, of which the role lies in that, the spherical shell-shaped rotor body is driven to steer by the circumferential magnetic force generated by the armatures 11 such as A1-A2, B1-B2, C1-C2, D1-D2, E1-E2, and the steering angle is tentatively 28 degrees, which is determined by the opening degree of the left roller support 88. The steering of the hub body is not subject to external force, but considering the stability of the hub body, the steering ball-basket universal joint 84, the sliding sleeve 85, the sliding pull rod 86, the spherical hinge bearing 87 having a sliding button, and the swing arm 83 are disposed on the vehicle's suspension frame to ensure the stability, and meanwhile steer with the steering of the hub body. When the vehicle steers, the spherical shell-shaped rotor body steers along with the hub body, the maximum steering angle of the hub body is 28 degrees, and the maximum displacement distance is 110-132 mm.

A vibration damper is disposed between the first stabilization mechanism and the second stabilization mechanism; the vibration damper comprises a spherical hinge damping bearing 97 disposed on the swing arm 83 of the first stabilization mechanism, a spring hanger 96 connected to the spherical hinge damping bearing 97, a spherical hinge connecting shaft 95 connected to the spring hanger 96, a movable rotating ball spindle 92 disposed on the spherical hinge connecting shaft 95, a movable sliding block 91 disposed on the rotating ball spindle 92, and a damping spring 98; the sliding block 91 comprises a fixing surface 93 having a T-shaped groove; the fixing surface 93 is connected to a vehicle body via a fixing screw 94, and two ends of the damping spring 98 are connected to the swing arms 83 of the first stabilization mechanism and the second stabilization mechanism via damping bearings 99, respectively. The rotary motor has high efficiency, large power, and large steering angle larger than or equal to 28 degrees. According to kinematic theory, the rotary motor has large inertia. To ensure the stability of the vehicle and prevent disturbance, when connecting the suspension frame to the upper cover of the vehicle, the fixing surface 93 having a T-shaped groove is disposed, and the movable rotating ball spindle 92 (the displacement distance is smaller than or equal to 150 mm) is disposed in the fixing surface 93. The universal movable sliding block 91 (L equal to 100 mm to 150 mm) has buffering and damping functions.

The vehicle involved in the invention preferably adopts a hybrid power mode, comprising an engine, generator, electronic control module, and four-wheel-drive steering tires. The generator outputs high direct voltage to the motor, the output power is large, which is obviously larger than the power generated by batteries-based pure electric vehicles. In addition, the application of the invention can substitute for the gear box of conventional vehicles, which put forwards a new direction for the research of hybrid power vehicles.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system comprising:
   a hub body and a connection mechanism, the connection mechanism configured to connect the hub body to a suspension of a vehicle;
   wherein the hub body comprises a ball joint universal rotary motor inside;
   wherein the ball joint universal rotary motor comprises a rotor body with an opening, a stator body disposed within the rotor body and connected to the connection mechanism, a first coil assembly and a second coil assembly both wound on the stator body;
   wherein the first coil assembly is configured to, when energized, cause the rotor body to rotate with respect to a first axis of the stator body, and the second coil assembly is configured to, when energized, cause the rotor body to rotate with respect to a second axis of the stator body, the first axis being not identical to the second axis.

2. The system of claim 1, further comprising a seal ring between the sealing block and each of the positioning blocks.

3. The system of claim 1, wherein the rotor body comprises a permanent magnet with a plurality of magnetic poles.

4. The system of claim 1, wherein the stator body comprises fixing axles configured to fix armatures of the stator body.

5. The system of claim 1, wherein a number of layers of armatures in the stator body is at least 3 and is an odd number.

6. The system of claim 1, further comprising wherein a magnetic-sensing device configured to detect magnetic fluxes of the permanent magnet, the first coil assembly and the second coil assembly.

7. The system of claim 1, further comprising a spherical bearing between the rotor body and the stator body.

8. The system of claim 7, wherein the spherical bearing comprises a spherical support disposed between the rotor body and the stator body, bearing balls uniformly distributed in the spherical support.

9. The system of claim 1, further comprising a brake mechanism on an outer surface of the rotor body and opposite to the opening, the braking mechanism comprising a first roller support fixed on the rotor body, a bearing seat, and a brake disposed on the first roller support;
   wherein a support seat of the brake is disposed on the bearing seat.

10. The system of claim 1, further comprising a main axle;
    wherein the main axle extends along the first axis and is fixedly connected to the stator body;
    wherein the main axle extends out of the rotor body from the opening.

11. The system of claim 1, wherein the hub body comprises a first stabilization mechanism and a second stabilization mechanism, disposed at two sides of the opening, respectively;
    wherein the first stabilization mechanism and the second stabilization mechanism each comprise:
    a support base on the rotor body,
    a left roller support on the support base,
    a spherical hinge bearing with a sliding button on the left roller support,
    a sliding pull rod on the spherical hinge bearing, a sliding sleeve on the sliding pull rod,
a steering ball-basket universal joint connected to the sliding pull rod, and
a swing arm connected to the steering ball-basket universal joint; and
wherein the swing arm is connected to a base via a swing hinge.

12. The system of claim 11, further comprising a vibration damper between the first stabilization mechanism and the second stabilization mechanism;
wherein the vibration damper comprises:
a spherical hinge damping bearing on the swing arm of the first stabilization mechanism,
a spring hanger connected to the spherical hinge damping bearing,
a spherical hinge connecting shaft connected to the spring hanger,
a movable rotating ball spindle on the spherical hinge connecting shaft,
a movable sliding block on the movable rotating ball spindle, and
a damping spring;
wherein the movable sliding block comprises a fixing surface having a T-shaped groove;
wherein the fixing surface is configured to connect to a body of the vehicle via a fixing screw, and
wherein two ends of the damping spring are connected to the swing arms of the first stabilization mechanism and the second stabilization mechanism via damping bearings, respectively.

13. The system of claim 10, wherein the connection mechanism comprises:
a ball basket universal joint connected to the main axle and comprising, a pull rod sliding sleeve,
an outer universal joint connecting to a chassis of the vehicle and the main axle,
a V-shaped lower swing connection rod, and
a suspension universal screw;
wherein the ball basket universal joint is connected to the main axle via the suspension universal screw.

14. The system of claim 10, further comprising a sealing block fixedly connected to the main axle;
wherein the rotor body comprises protective sliding sleeves on opposite sides across the opening;
wherein the sealing block and the protective sliding sleeves are configured to provide a sliding seal with the rotor body across the opening.

15. The system of claim 14, wherein each of the sliding sleeves comprises a positioning block.

16. The system of claim 1, further comprising a Hall device configured to detect a relative position of the rotor body and the stator body.

17. The system of claim 1, wherein the stator body comprises multiple layers of armatures in a shape of spherical segment;
wherein the multiple layers of armatures are symmetrically distributed with respect to the first axis;
wherein the stator body comprises a spacer layer between every two adjacent layers of multiple layers of armatures;
wherein the multiple layers of armatures and spacer layers comprise tapered holes;
wherein the stator body comprises a plurality of winding slots configured to accommodate the first coil assembly and the second coil assembly.

* * * * *